United States Patent
Kim

(10) Patent No.: US 9,123,926 B2
(45) Date of Patent: Sep. 1, 2015

(54) SECONDARY BATTERY WITH TERMINAL PLATE

(75) Inventor: Tae Won Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1328 days.

(21) Appl. No.: 12/574,892

(22) Filed: Oct. 7, 2009

(65) Prior Publication Data

US 2010/0086850 A1 Apr. 8, 2010

(30) Foreign Application Priority Data

Oct. 8, 2008 (KR) .......................... 10-2008-0098829

(51) Int. Cl.
*H01M 2/26* (2006.01)
*H01M 2/06* (2006.01)
*H01M 2/22* (2006.01)
*H01M 2/04* (2006.01)

(52) U.S. Cl.
CPC .............. *H01M 2/0426* (2013.01); *H01M 2/22* (2013.01)

(58) Field of Classification Search
None
See application file for complete search history.

(56) References Cited

U.S. PATENT DOCUMENTS

2006/0040179 A1* 2/2006 Bang ............................. 429/178

FOREIGN PATENT DOCUMENTS

| JP | 2005-340048 | 12/2005 |
|---|---|---|
| KR | 10-2006-0011311 A | 2/2006 |
| KR | 1020060011314 A | 2/2006 |
| KR | 100709872 B1 | 4/2007 |
| KR | 1020070107921 A | 11/2007 |

OTHER PUBLICATIONS

Korean Notice of Allowance dated Nov. 12, 2010 issued by the KIPO for corresponding Koran Patent Application No. 10-2008-0098829, 5 pages.
Machine translation of corresponding patent JP 2005-340048, (2005).

* cited by examiner

*Primary Examiner* — Yoshitoshi Takeuchi
(74) *Attorney, Agent, or Firm* — Christie, Parker & Hale, LLP

(57) ABSTRACT

A secondary battery including: an electrode assembly including two electrode taps; and a cap assembly including a terminal plate. The terminal plate includes a tap connecting portion that is laser welded to one of the electrode taps. The tap connecting portion includes a curved portion that has an apex that extends along the length of the terminal plate, to which the one electrode tap is welded.

13 Claims, 4 Drawing Sheets

SECONDARY BATTERY WITH TERMINAL PLATE

CROSS-REFERENCE TO RELATED APPLICATION

This application claims the benefit of Korean Application No. 10-2008-0098829, filed on Oct. 8, 2008, in the Korean Intellectual Property Office, the disclosure of which is incorporated herein, by reference.

BACKGROUND OF THE INVENTION

1. Field of the Invention

Aspects of the present invention relate to a secondary battery.

2. Description of the Related Art

As portable, light-weight, high-end devices, such as video cameras, portable phones, portable computers, and the like, have become more popular, research and development related to secondary batteries, which are used to power these devices, have also been conducted. There are various types of secondary batteries, such as nickel-cadmium (Ni—Cd) batteries, Nickel-Metal hydride (Ni-MH) batteries, Nickel-Zinc (Ni—Zn) batteries, and lithium ion batteries. In particular, lithium ion batteries are widely used in high-tech electronics, because they are rechargeable and can have a small size, a high capacity, a high operating voltage, and a high energy density per unit weight.

A lithium ion secondary battery includes an electrode assembly, a can to house the electrode assembly, and a cap assembly to seal an opening of the can. The electrode assembly includes a positive electrode plate, a negative electrode plate, and a separator disposed therebetween. During the assembly, two electrode taps of the electrode assembly are welded to a cap plate and a terminal plate of the cap assembly. In the related art, the two electrode taps are resistance welded to the cap assembly. However, resistance welding can interfere with the periodic maintenance of the electrodes (grinding and replacement), due to electrode wear, and can result in defective electrodes, due to spatter generated during the resistance welding.

SUMMARY OF THE INVENTION

Aspects of the present invention provide a secondary battery having an improved cap assembly.

Aspects of the present invention provide a secondary battery having a structure that enhances the reliability of electrode welding and production costs.

Aspects of the present invention also provide a terminal plate of a secondary battery that improves the reliability of the welding of the secondary battery.

According to aspects of the present invention, there is provided a secondary battery comprising: an electrode assembly including two electrode taps; and a cap assembly including a terminal plate. The terminal plate includes a tap connecting portion that is connected to one of the two electrode taps. The tap connecting portion includes a curved portion having a convex side that varies in height, to which the electrode tap is connected.

According to aspects of the present invention, the curved portion includes a concave side opposing the convex side. In this case, the tap connecting portion further includes two flat portions that extend from opposing sides of the curved portion.

According to aspects of the present invention, the curved portion comprises a flat side opposite to the convex side. In this case, the tap connecting portion further comprises two flat portions connected to two opposing sides of the curved portion. The convex side is smoothly connected to the flat portions, without forming a defined crease.

According to aspects of the present invention, the terminal plate comprises a flat terminal connecting portion that extends from an end of the tap connecting portion. The terminal connecting portion has a terminal through-hole.

According to aspects of the present invention, the apex of the convex side protrudes by a distance that is from 45% to 55% greater than the thickness of the terminal connecting portion.

According to aspects of the present invention, the width of the curved portion ranges from 50% to 80% of the width of terminal plate.

According to aspects of the present invention, the apex of the convex side extends along the length of the terminal plate.

According to aspects of the present invention, the electrode taps are laser welded to the cap assembly.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following description of the exemplary embodiments, taken in conjunction with the accompanying drawings, of which.

DETAILED DESCRIPTION OF THE EXEMPLARY EMBODIMENTS

Figure 1:
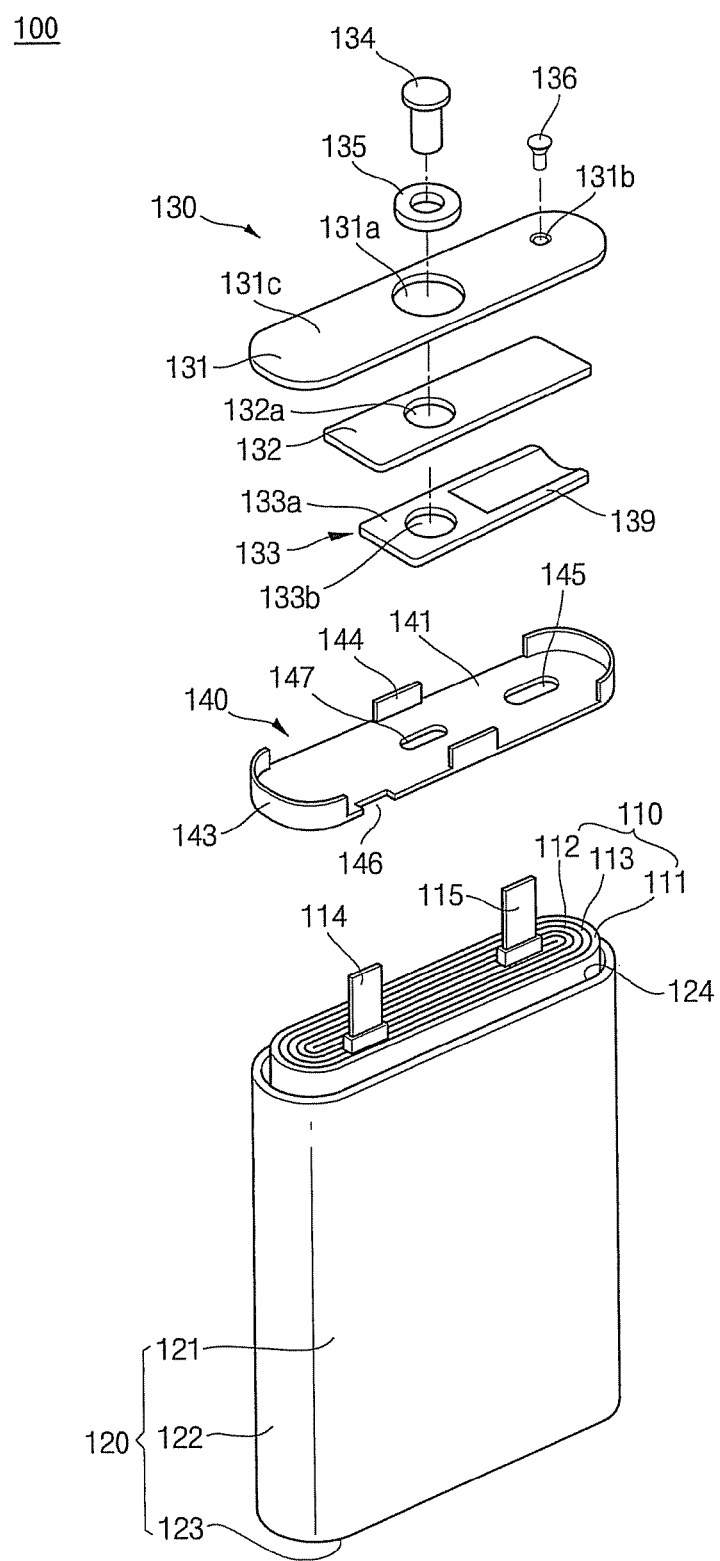
FIG. 1 is an exploded perspective view of a secondary battery having a terminal plate, according to an exemplary embodiment of the present invention.

Reference will now be made in detail to the exemplary embodiments of the present invention, examples of which are illustrated in the accompanying drawings, wherein like reference numerals refer to the like elements throughout. The exemplary embodiments are described below, in order to explain the aspects of the present invention, by referring to the figures.

Figure 2:
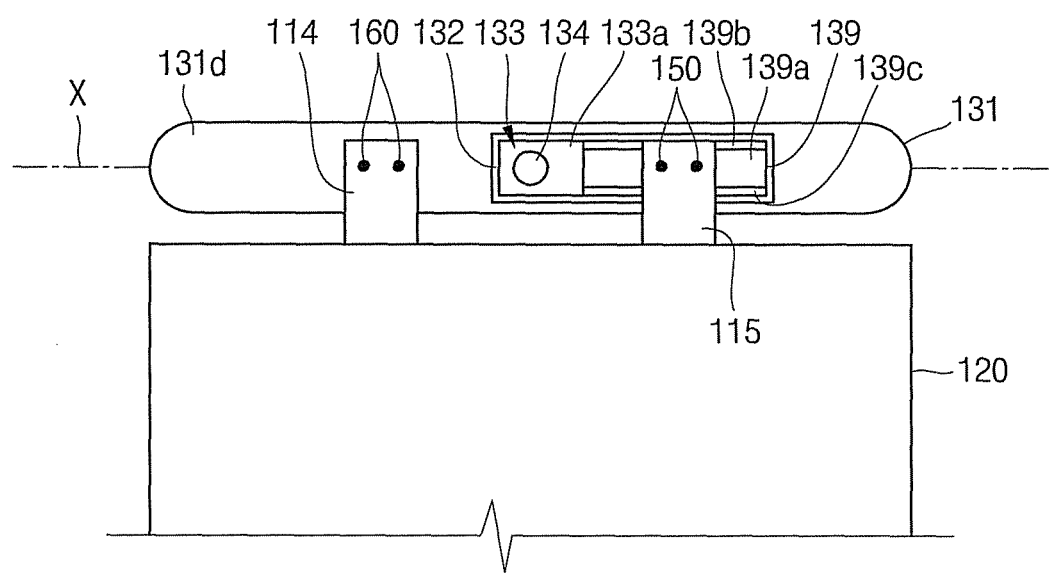
FIG. 2 is a view illustrating welding state of two electrode taps of the electrode assembly shown in FIG. 1.
Figure 3:
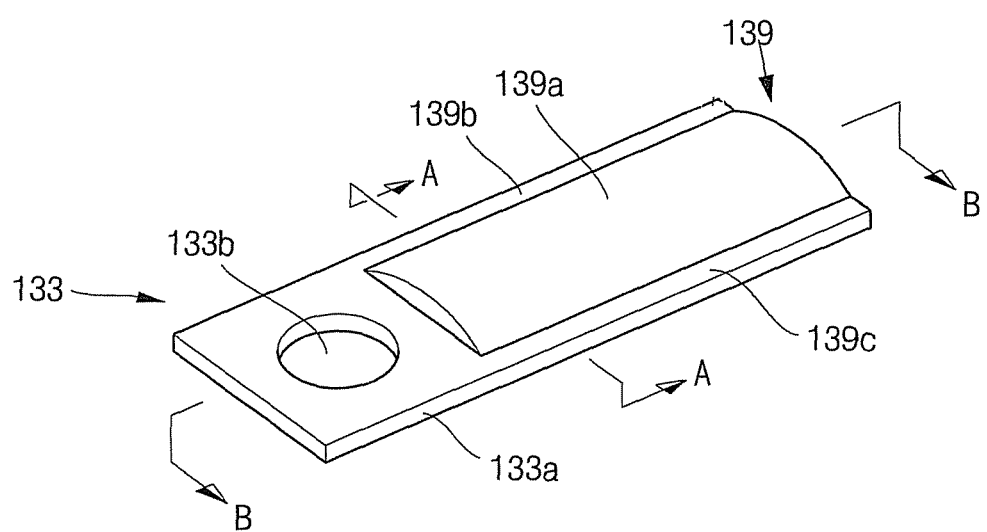
FIG. 3 is a perspective view illustrating the terminal plate shown in FIG. 1, illustrating welding portions on the terminal plate.

Referring to FIGS. 1-3, a secondary battery 100, according to an exemplary embodiment, includes an electrode assembly 110, a can 120, a cap assembly 130, and an insulation case 140. The electrode assembly 110 includes a first electrode plate 111, a second electrode plate 112, and a separator 113 inserted between the electrode plates 111 and 112. The components of the electrode assembly 110 are wound into a jellyroll-type shape. A first conductive electrode tap 115 is coupled with the first electrode plate 111 and protrudes from the top of the electrode assembly 110. A second conductive electrode tap 114 is coupled with the second electrode plate 112 and protrudes from the top of the electrode assembly 110.

In this exemplary embodiment, the first electrode plate 111 is negatively charged (a negative electrode plate), and the second electrode plate 112 is positively charged (a positive electrode plate). Thus, the first electrode tap 115 can be referred to as a negative electrode tap, and the second electrode tap 114 can be referred to as a positive electrode tap. However, the present invention is not so limited, as the polarities of these components can be reversed. The two electrode taps 114 and 115 can be made of nickel, for example, but are not so limited.

The can 120 includes a bottom plate 123, large side walls 121, and small side walls 122. The can 120 has an opening 124 formed at an end thereof. The can 120 can be made of a metal, for example, aluminum, an aluminum alloy, or the like. The can 120 can be formed by deep drawing, for example.

The cap assembly 130 includes a cap plate 131, an insulation plate 132, a terminal plate 133, and an electrode terminal 134. The cap plate 131 is generally metallic and corresponds to the opening 124. The long axis of the cap plate 131 extends along line X. The cap plate 131 has an outer side 131c and an opposing inner side 131d. The outer side 131c faces away from the can 120, while the inner side 131d faces toward the can 120.

The positive electrode tap 114 is welded to the inner side 131d of cap plate 131, at welding portions 160. The cap plate 131 has a terminal through-hole 131a formed at the center thereof, and an electrolyte injection hole 131b formed on a side thereof. An electrode terminal 134 is inserted into the terminal through-hole 131a. A circular gasket 135 insulates the electrode terminal 134 from the cap plate 131. An electrolyte is injected through the electrolyte injection hole 131b. A stopper 136 seals the electrolyte injection hole 131b.

The long axis of the insulation plate 132 extends along line X. The insulation plate has a passage hole 132a formed on a side thereof. Through the passage hole 132a, the electrode terminal 134 passes. The insulation plate 132 contacts the inner side 131d of the cap plate 131 and electrically insulates the terminal plate 133 from the cap plate 131.

Referring to FIGS. 1-5, the long axis of the terminal plate 133 extends along line X. The terminal plate 133 is electrically insulated from the cap plate 131, by the insulation plate 132. In other words, since the insulation plate 132 is positioned between the terminal plate 133 and the cap plate 131, the terminal plate 133 and the cap plate 131 are insulated from each other.

The terminal plate 133 includes a terminal connecting portion 133a and a tap connecting portion 139. The terminal connecting portion 133a is generally plate-shaped and has a through-hole 133b. The electrode terminal 134 passes through the through-hole 133b. An end of the electrode terminal 134 is enlarged to help integrate the cap plate 131, the insulation plate 132, and the terminal plate 133. The electrode terminal 134 and the terminal plate 133 are electrically connected to each other. The terminal connecting portion 133a contacts the insulation plate 132.

The tap connecting portion 139 extends from the terminal connecting portion 133a along line X. The tap connecting portion 139 includes a curved portion 139a, and first and second flat portions 139b and 139c. The curved portion 139a has a convex side 139d and an opposing concave side 139e. The convex side 139d is uniformly curved, and has an apex that extends along the length of the terminal plate 139. The height of the first side 139d varies in a width direction (perpendicular to line X) of the terminal plate 139.

The convex side 139d protrudes, with respect to the surfaces of the lateral flat portions 139b and 139c, by a distance that is 45% to 55% greater than the thicknesses of the lateral flat portions 139b and 139c. These numerical values correspond to the amount the negative electrode tap 115 protrudes over the tap connecting portion 139, when the negative electrode tap 115 is clamped to the tap connecting portion 139, during welding. The negative electrode tap 115 is laser welded to the convex side 139d. Two welding portions 150 are formed where the negative electrode tap 115 is welded to the apex of the convex side 139d (i.e., the welding portions are disposed along line X). The curvature of the concave side 130e corresponds to the curvature the convex side 139d.

Thus, when the negative electrode tap 115 is clamped to the tap connecting portion 139, during the laser welding process, although the negative electrode tap 115 protrudes, the terminal plate 133 and the negative electrode tap 115 are maintained in close contact. The tap connecting portion 139 is longer than the width of the negative electrode tap 115, so as to cope with a positional change of the negative electrode tap 115.

The first flat portion 139b and the second flat portion 139c are connected to opposing sides of the curved portion 139a. The first and second flat portions 139b and 139c are in the same plane as the terminal connecting portion 133a. Two connecting portions 139f are formed where the concave side 139d of the curved portion 139a is connected to the first and second flat portions 139b and 139c. The connecting portions 139f allow the first and second flat portions 139b and 139c to be connected to the curved portion 139a, without forming a defined crease. The first and second flat portions 139b and 139c generally have the same width. Clamps 170a and 170b are positioned on the first and second flat portions 139b and 139c, during the laser welding. The first and second flat portions 139b and 139c contact the insulation plate 132.

The curved surface 139d protrudes from surfaces of the flat portions 139b and 139c, by a distance ranging from 1.9 mm to 3.0 mm. The width of the curved portion 139a is generally from 50% to 80% of the width of the tap connecting portion 139. These dimensions correspond to a protruded width of the negative electrode tap 115, when problems occur during the clamping and laser welding of the negative electrode tap 115. The terminal plate 133 can be made of nickel, or the like.

Referring to FIGS. 1 and 2, the electrode terminal 134 passes through the terminal through-hole 131a of the cap plate 131, the passage through-hole 132a of the insulation plate 132, and the through-hole 133b of the terminal plate 133. The electrode terminal 134 is insulated from the cap plate 131, by the insulation gasket 135 and the insulation plate 132, and is electrically connected to the terminal plate 133.

Referring to FIG. 1, the insulation case 140 includes a main body 141, small side supports 143, and large side supports 144. The small and large side supports 143 and 144 extend from edges of the main body 141, away from the can 120. The main body 141 is plate-shaped and corresponds to the opening 124 of the can 120. The main body 141 includes a first electrode tap drawing hole 145, through which the negative electrode tap 115 is drawn, a second electrode tap drawing hole 146, through which the positive electrode tap 114 is drawn, and an electrolyte injection hole 147, through which the electrolyte is injected into the can 120. The insulation case 140 insulates the electrode assembly 110 from the cap assembly 130.

The manufacturing process of the secondary battery 100 will be described in detail, with reference to FIGS. 1-5. Firstly, the electrode assembly 110, the can 120, and the cap assembly 130, as shown in FIG. 1, are prepared. Next, the electrode assembly 110 is accommodated in the can 120. In this case, the negative electrode tap 115 and the positive electrode tap 114 protrude through the opening 124 of the can 120.

The insulation case 140 is inserted into the can 120, through the opening 124 of the can 120. The negative electrode tap 115 protrudes through the first electrode tap drawing hole 145 of the insulation case 140, and the positive electrode tap 114 protrudes through the second electrode tap drawing hole 146 of the insulation case 140.

The negative electrode tap 115 is electrically connected to the terminal plate 133, and the positive electrode tap 114 is electrically connected to the cap plate 131. The negative electrode tap 115 is laser welded to the tap connecting portion 139 of the terminal plate 133, as shown in FIG. 4.

Figure 4:
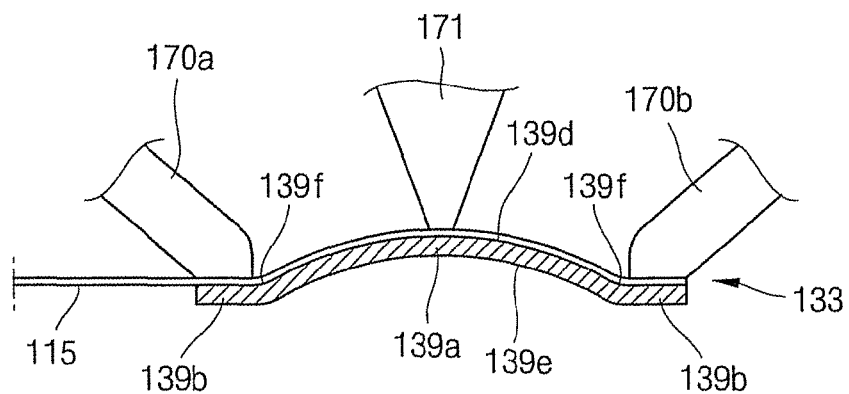
FIG. 4 is sectional view taken along line A-A of the terminal plate shown in FIG. 3.
Figure 5:
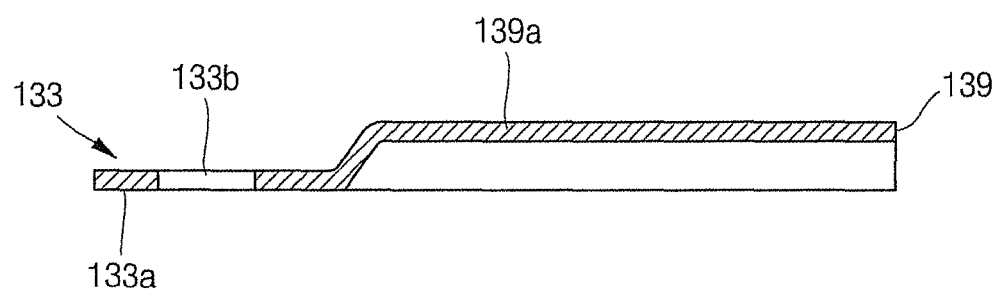
FIG. 5 is a sectional view taken along line B-B of the terminal plate shown in FIG. 3.

Referring to FIG. 4, when an end of the negative electrode tap 115 is positioned at approximately the same position as a lateral end of the second flat portion 139c, the negative electrode 115 covers the convex side 139d of the terminal plate 133. In this state, the clamps 170a and 170b are used to press the negative electrode tap 115 against the connecting portion 139. The clamps 170a and 170b are positioned on the first and second flat portions 139b and 139c, respectively. Since the convex side 139d of the terminal plate 133 protrudes, even if the negative electrode tap 115 is deformed upwardly, due to clamping errors, the negative electrode tap 115 remains in close contact with the convex side 139d.

After clamping, a laser beam 171 is used to perform the welding. Since the welding is performed at two positions, along the apex of the curved portion 139a (along line X), as shown in FIG. 2, the two welding portions 150 are formed. Three or more of the welding portions 150 may be formed along the apex of the curved portion 139a, or the welding may form a seam.

The positive electrode tap 114 is electrically connected to the first side 131d of the cap plate 131, by the laser welding. The welding portions 160 are formed along line X. Three or more of the welding portions 160 may be formed, or the welding may form a seam.

Next, the cap plate 131 is attached to the opening 124 of the can 120, by welding or the like. The electrolyte is injected into the can 120, through the electrolyte injection hole 131b. The electrolyte injection hole 131b is sealed by the stopper 136, to complete the secondary battery 100.

Figure 6A:
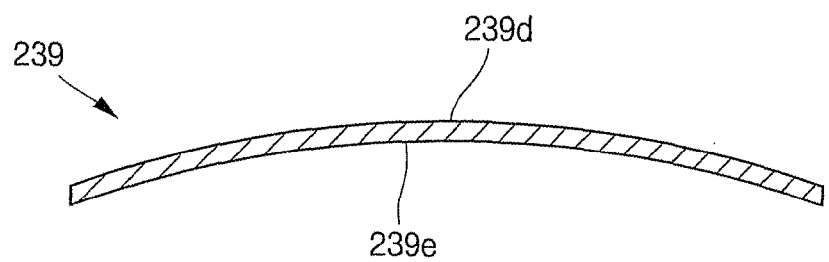
FIG. 6A is a sectional view illustrating a terminal plate, according to another exemplary embodiment of the present invention.

FIG. 6A illustrates a section of a tap connecting portion 239 of a terminal plate, according to another exemplary embodiment of the present invention. Referring to FIG. 6A, the tap connecting portion 239 is curved and includes a convex side 239d and an opposing concave side 239e, but does not include the first and second flat portions 139b and 139c illustrated in FIG. 4. The shape of the tap connecting portion 239 makes laser welding easier. For example, a clamp having a contacting surface with the same curvature as the convex side 239d can be used to clamp an electrode tap, regardless of the position of the clamp.

Figure 6B:
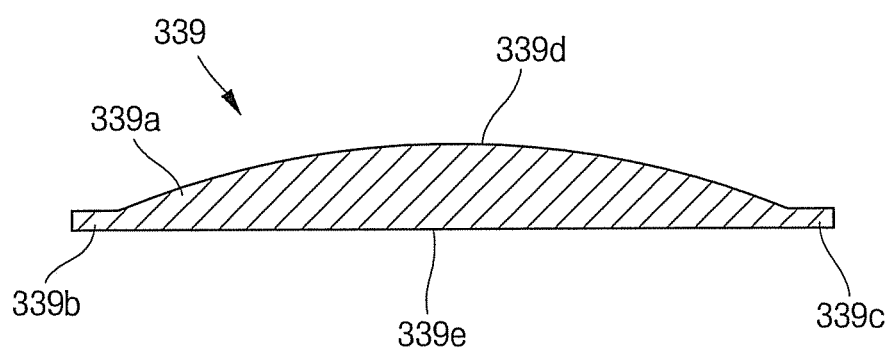
FIG. 6B is a sectional view illustrating a terminal plate, according to still another exemplary embodiment of the present invention.

FIG. 6B illustrates a section of a tap connecting portion 339 of a terminal plate, according to still another exemplary embodiment of the present invention. Referring to FIG. 6B, the tap connecting portion 339 includes a curved portion 339a, a first flat portion 339b, and a second flat portion 339c. The curved portion 339a includes a convex side 339d and an opposing flat side 339e. Since the curved portion 339a is thicker than other portions of the terminal plate, the curved portion is more resistant to deformation during clamping.

Figure 6C:
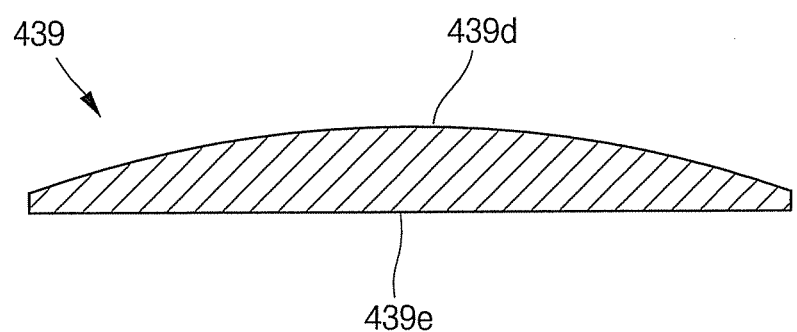
FIG. 6C is a sectional view illustrating a terminal plate, according to still another exemplary embodiment of the present invention.

FIG. 6C illustrates a section of a tap connecting portion 439 of a terminal plate, according to still another exemplary embodiment of the present invention. Referring to FIG. 6C, the tap connecting portion 439 includes a convex side 439d and an opposing flat side 439e. This terminal plate has the advantages of the terminal plates illustrated in FIGS. 6A and 6B.

Although a few exemplary embodiments of the present invention have been shown and described, it would be appreciated by those skilled in the art that changes may be made in these exemplary embodiments, without departing from the principles and spirit of the invention, the scope of which is defined in the claims and their equivalents.

What is claimed is:

1. A secondary battery comprising:
   an electrode assembly comprising first and second electrode taps; and
   a terminal plate having a curved portion that has an apex that extends along a length of the terminal plate,
   wherein the first electrode tap is connected to a convex side of the curved portion,
   wherein a width of the curved portion is from 50% to 80% of a width of the terminal plate, and
   wherein the curved portion extends to an edge of the terminal plate in a length direction of the terminal plate.

2. The secondary battery of claim 1, wherein the curved portion has a concave side that opposes the convex side.

3. The secondary battery of claim 2, wherein the terminal plate has two flat portions that extend along the length of the terminal plate, from opposing edges of the curved portion.

4. The secondary battery of claim 3, wherein the two flat portions are connected to the curved portion, without forming a defined crease between surfaces thereof and a convex surface of the curved portion.

5. The secondary battery of claim 1, wherein the curved portion has a flat side that opposes the convex side.

6. The secondary battery of claim 5, wherein the terminal plate has two flat portions that extend along the length of the terminal plate, from opposing edges of the curved portion.

7. The secondary battery of claim 6, wherein two flat portions are connected to the curved portion, without forming a defined crease between surfaces thereof and a convex surface of the curved portion.

8. The secondary battery of claim 1, wherein the terminal plate has a flat terminal connecting portion that extends from the curved portion.

9. The secondary battery of claim 8, wherein the terminal plate has a terminal through-hole.

10. The secondary battery of claim 1, wherein the apex of the convex side protrudes from the rest of the terminal plate, by a distance that is from 145% to 155% of a thickness of the rest of the terminal plate.

11. The secondary battery of claim 1, wherein the convex side has a consistent curvature along the length of the terminal plate.

12. The secondary battery of claim 1, wherein: the first electrode tap is laser welded to the curved portion of the terminal plate; and the second electrode tap is laser welded to a cap plate of a cap assembly.

13. The secondary battery of claim 1, wherein a convex surface of the curved portion protrudes toward the electrode assembly.

\* \* \* \* \*